United States Patent [19]

Olds

[11] Patent Number: 4,482,575
[45] Date of Patent: Nov. 13, 1984

[54] AERATED OIL-BASED CHEESE MIXTURE

[75] Inventor: Dale F. Olds, Dublin, Calif.

[73] Assignee: Frito-Lay, Inc., Dallas, Tex.

[21] Appl. No.: 415,938

[22] Filed: Sep. 8, 1982

[51] Int. Cl.³ .................. A23C 19/00; A23D 5/00
[52] U.S. Cl. .................................. 426/582; 426/585; 426/613
[58] Field of Search ............ 426/582, 585, 613, 36, 426/580, 516

[56] References Cited

U.S. PATENT DOCUMENTS

| | | | |
|---|---|---|---|
| 2,015,257 | 9/1935 | Clickner | 426/582 |
| 2,279,202 | 4/1942 | Musher | 426/582 |
| 4,310,561 | 1/1982 | Buddemeyer et al. | 426/613 |
| 4,349,576 | 9/1982 | Lehnhardt et al. | 426/582 |

FOREIGN PATENT DOCUMENTS 952761 8/1974 Canada .......................... 426/582

*Primary Examiner*—George Yeung
*Attorney, Agent, or Firm*—Bernard, Rothwell & Brown

[57] ABSTRACT

Aerated or aeratable oil-based cheese composition with 70% or greater overrun is capable of withstanding hot extrusion and is capable of withstanding a baking temperature when included as a filling within a cereal collet. The composition includes a base of bland, stable hydrogenated vegetable oil, finely powdered cheese solids, polyglycerol monostearate as an aerating agent, a protein based stabilizing agent such as modified whey or non-fat dry milk, and lecithin for controlling viscosity and aiding in the blending of the lipid and solid ingredients. Optional ingredients include stearine, mono and diglycerides, flavoring aids or additions such as citric acid powder and powdered salt, and whey solids used as a filler.

9 Claims, No Drawings

AERATED OIL-BASED CHEESE MIXTURE

TECHNICAL FIELD

The present invention relates to aerated oil based cheese foods or fillings.

DESCRIPTION OF THE PRIOR ART

Prior art cheese compositions are generally unsuitable for being aerated and withstanding hot extrusion techniques as well as withstanding baking temperatures. Many prior art cheese compositions contain substantial quantities of moisture which requires that the compositions be refrigerated to avoid spoilage; also, moisture tends to render crisp cereal portions of a snack soggy. Triglycerol monostearate is known to be an effective aerating agent in many oil based products such as peanut butter, chocolate compositions, and pastel confections.

SUMMARY OF THE INVENTION

The invention is summarized in an aerated or aeratable oil based cheese composition including bland, stable hydrogenated vegetable oil, powdered cheese solids, protein containing material such as modified whey and/or non-fat dry milks, polyglycerol monostearate, and lecithin. The protein containing material sets the foam producing stability during hot extrusion and baking. The lecithin, a dispersing agent for solids, and the protein containing material complement the aerating properties as well as the heat stability properties of the composition.

An object of the invention is to produce a cheese-like filling which can be utilized within a cereal collet.

Another object of the invention is to produce an aerated cheese composition which remains stable when subjected to high pressure, hot extrusion and baking.

One advantage of the invention is that an oil based cheese composition with very little moisture results in a product similar to cheese which can be included as a filling in a cereal collet and is stable over an extended period or shelf life without refrigeration.

Another advantage of the invention is that an oil based cheese composition which is aerated is less satiating and lighter in texture as well as being less costly than non-aerated cheese compositions.

One feature of the invention is that lecithin and modified whey, or non-fat milk complement polyglycerol monostearate in formation and stabilization of aerated foam.

Other objects, advantages, and features of the invention will be apparent from the following description of the preferred embodiment.

DESCRIPTION OF THE PREFERRED EMBODIMENTS

An aerated or aeratable oil based cheese composition or mixture in accordance with the invention includes a fat such as a bland, stable hydrogenated vegetable oil, powdered cheese solids dispersed within the fat, polyglycerol monostearate, a protein containing stabilizing agent such as modified whey or non-fat dry milk, and lecithin. Additionally, the composition may include whey solids for a low cost filling material, mono and diglycerides, stearine, and various flavor enhancers or additives. The cheese composition is suitable for being included within a baked cereal collet to form a snack.

The composition must not contain substantial quantities of moisture in order to avoid sogginess in a surrounding cereal collet as well as to render the composition suitable for substantial shelf life without refrigeration. For example, ingredients producing a total moisture content of about 2% by weight of the composition are found to avoid sogginess and spoilage. Additionally, the lipid ingredients are selected to produce a non-weeping composition at temperatures up to about 100° F. (38° C.).

The function of the hydrogenated vegetable oil is to provide structure and sensory properties that make the product similar to cheese without having moisture present. The hydrogenated vegetable oil must have stability, such as enough stability against oxidative deterioration to meet a four weeks at 100° F. (38° C.) storage requirement, and have a bland flavor. Also, the hydrogenated vegetable oil has a melting point range which is sufficiently high to produce a fairly uniform product consistency over a 70°-90° F. (20°-32° C.) temperature range without resulting in a waxy or greasy mouth feel when eaten. Suitable hydrogenated vegetable oils are found in the vegetable hard butters with melting points in the range of 90°-110° F. (32°-43° C.). Fats with melting points below 90° F. (32° C.) are too soft or liquid to meet minimum firmness requirements, and fats with melting points up to 92° F. (33° C.) such as 92° F. hydrogenated coconut oil and mixtures of hydrogenated soybean and/or cottonseed hard butters with liquid oil fractions have generally satisfactory eating qualities, but tend to result in oil weepage during 100° F. (38° C.) storage. Especially suitable is a commercial icing fat containing partially hydrogenated soybean and cottonseed oils, together with mono and diglycerides, polyglycerol esters of fatty acids, and propylene glycol sold under the trademark Betricing II by Durkee Foods, a subsidiary of SCM Corporation. Also specially suitable is 100° F. (38° C.) hydrogenated coconut oil when blended with a stearine selected to provide more solid fat at 90° F. (32° C.) to give more uniform consistency over the temperature range of 70°-90° F. (20°-32° C.). Generally, the hydrogenated vegetable oil is from 38% to 50% by weight of the product. For icing fat, it is preferred that the fat be from 40% to 50% by weight of the total product, while for coconut oil it is preferred to constitute between 42 and 50% by weight of the product. With the coconut oil butter, a quantity of stearine between 1.5 to 2% by weight is preferred to provide more solid fat at 90° F. (32° C.) imparting a more uniform consistency to the final product over a temperature range of 70° to 90° F. (20°-32° C.).

The polyglycerol monostearate is formed primarily of triglycerol monostearate with lesser quantities of bi and tetraglycerol monostearate. Generally, quantities of triglycerol monostearate containing material of from 2 to 4% by weight of the final product is preferred. The triglycerol monostearate is the key ingredient in enabling substantial aeration of the oil-based cheese product.

The protein containing, heat stabilizing agent such as modified whey (containing about 35% by weight protein) or non-fat dry milk sets the foam so that it withstands the higher temperatures used in extrusion and baking. Initial cheese prototype foam consisting of hydrogenated vegetable oil, triglycerol monostearate, lecithin, cheese powder, and whey solids did not retain its structure during baking; thus, the protein containing, heat stabilizing agent has been proven necessary to render the aerated cheese product stable at higher temperatures. Non-fat dry milk and modified whey are preferred for their enhancement of the flavor of the product and appear to be equally effective in stabilizing the product during baking. Furthermore, both modified whey and non-fat dry milk have been found to enhance the aerating or whipping characteristics of the mixture. Generally, a quantity of stabilizing agent forming between about 8 and 18% by weight of the final mixture is effective to stabilize the foam mixture during hot extrusion and baking. Mouth drying occurs at 18% and above; however, if modified with mono and diglycerides, then more than 18% can be employed without mouth drying.

Cheese powders are selected for high flavor impact without off-flavor. Cheddar cheese type flavor is primarily the desired flavor since it appeals to most consumers. Cheese powders other than Cheddar, such as Bleu, Parmesan, Romano, and Limburger, can be blended in at low levels to boost cheese impression. Generally, a quantity of commercial cheese powder (usually containing other ingredients such as whey solids, buttermilk solids, salt, disodium phosphate, extractions of annatto and lactic acid and/or artificial color) forming between about 20 and 40% by weight of the final mixture provides suitable cheese flavor. A quantity of commercial cheddar-type cheese powder of about 30% is preferred.

Lecithin is added to control viscosity and to aid in dispersing and mixing of the powder ingredients in the oil prior to aeration. Lecithin is also found to contribute to the aeration of the final product to some degree. Quantities of lecithin between about 0.3% and 0.7% by weight have been found effective.

Mono and diglycerides are desirable for improving texture of the cheese product. They increase the moist-feeling texture of the cheese product to reduce dryness in mouth feel. A commercial material containing principally mono and diglycerides has been found effective when employed in quantities of about 2% by weight.

Flavoring agents such as salt, citric acid, natural cheese flavors, and/or cheese flavor boosters can be used to accentuate cheese flavor. These ingredients help replace some of the cheese flavor notes lost during baking and help to balance the overall flavor impression.

Whey solids, a by-product of cheesemaking, can be used as an inexpensive filler up to about 20% by weight without deteriorating characteristics of the product. The whey solids additionally accentuate the cheese flavor.

The process for manufacturing the aerated cheese-based mixture includes melting and combining the lipid ingredients (fat, triglycerol monostearate, lecithin, mono and diglycerides). Generally, a temperature of about 165° F. (74° C.) is sufficient to melt the lipid ingredients. Then, the other ingredients (cheese powders, modified whey, whey solids, salt, citric acid, and other flavoring agents) are blended into the melted mixture. The mixture is cooled or allowed to cool to a temperature in the range from 125° to 130° F. (51°-54° C.), and then aerated, for example by whipping. Whipping is continued until the temperature has dropped to within the range from 110°-115° F. (43°-46° C.). The product volume is increased from 50% to 100% or more, depending upon formulation, by the aeration.

The cheese product is now ready for extrusion as a filling in a collet. Extrusion is preferably performed shortly, less than one-half hour, after whipping while the cheese product has a temperature in the range from 110°-115° F. (43°-46° C.), and must be performed prior to the product being set. The product begins to set at temperatures below about 110° F. (43° C.). A substantial loss in overrun occurs if the aerated product is set, re-warmed, and then extruded. However, an aerated product which has been cooled and set may be melted and re-whipped at least twice without a loss of whipping characteristics.

In an alternate process, the particle size of the solids may be reduced, such as by using a roller refiner. The fat or hydrogenated oil and solid materials are mixed into a paste which is refined down to a 25 to 30 micron particle size range in the roller refiner. The paste and remaining ingredients are melted and mixed together and then whipped and extruded. The refined cheese filling product is smoother, has a slightly brighter color, and has a slight increase in cheese flavor. However, the refined filling does not whip to as high an overrun as unrefined filling of the same formula.

The following examples were devised using test samples and computerized studies designed to optimize the formulation.

EXAMPLE I

A cheese product is prepared using the ingredients of Table I.

TABLE I

| Ingredient | % by weight |
|---|---|
| Icing fat (Betricing II) | 40.0 |
| Cheddar cheese powder (Cheztone 113) | 20.0 |
| Modified whey (Foretein 35) | 15.0 |
| Romano, Cheddar, Parmesan cheese powder blend (Cheztone 404) | 10.0 |
| Whey solids (Teklac Grind B) | 8.0 |
| Triglycerol monostearate (Santone 3-1-S) | 3.0 |
| Mono and diglycerides (Dimodan PV-K) | 2.0 |
| Salt, vacuum micro powder | 1.0 |
| Lecithin (Sta-Sol UF) | 0.6 |
| Citric acid powder | 0.4 |

The icing fat, triglycerol monostearate, mono and diglycerides, and lecithin are combined in a jacketed mixer and heated to 165° F. (74° C.), above the melting point of the highest melting fat ingredient. The dry ingredients are blended into the melted fat. The blended ingredients are placed in a Hobart mixing bowl. The wire whip is attached and the speed selector is set at the highest speed. Whipping is begun when the product is cooled to about 125° F. (52° C.) and continued until the temperature has dropped to about 115° F. (46° C.). Product is then extruded while at a temperature range of about 115° F. (46° C.). The extrusion is through a co-extruder where the cheese product is extruded as a center within a tube of cornmeal based dough. After cutting into segments, the collets with the center filled with the cheese mixture are baked at a temperature of 300° F. (149° C.) for 5 minutes to complete the snack product.

During the whipping, the volume of the cheese product is increased by about 80%. The overrun after extrusion and baking is about 70%. The cheese filling has substantially no shrinkage after being stored at 100° F. for 4 weeks. Organoleptic tests judge that the firmness and dryness in texture of the cheese filling is about 3 in a scale of 1-5 wherein 5 is ideal or cheese-like in texture.

EXAMPLE II

A cheese product is made using the ingredients of Table II and using the same procedures as utilized in Example I. The cheese product has an overrun of 86.7% after whipping and an overrun of 73.3% after extrusion. A penetrometer measurement at 70° F. produces a reading of 5.56 millimeters (9.38 grams, ¼ size, ASTMD-1403 cone and plunger with 100 gram weight added). A penetrometer measurement at 90° F. (with only a 50 gram weight added) produces a reading of 5.67 mm. Organoleptic ratings of firmness and texture average 2.83 and 2.65, respectively. In comparing with Example I, it is seen that additional triglycerol monostearate increases overrun but elimination of mono and diglycerides reduce the firmness and dryness in texture.

TABLE II

| Ingredient | % by weight |
|---|---|
| Icing Fat | 40.0 |
| Cheddar cheese powder | 20.0 |
| Modified whey | 16.0 |
| Cheese powder blend | 10.0 |
| Whey solids | 8.0 |
| Triglycerol monostearate | 4.0 |
| Powdered salt | 1.0 |
| Lecithin | 0.6 |
| Citric acid powder | 0.4 |

EXAMPLE III

A cheese filling is produced using the ingredients of Table III.

TABLE III

| Ingredient | % by weight |
|---|---|
| 100° F. hydrogenated coconut oil | 46.0 |
| Cheddar cheese powder (Rogers 8100) | 20.0 |
| Modified whey | 16.0 |
| Cheese powder blend | 10.0 |
| Whey solids | 2.6 |
| Triglycerol monostearate | 3.0 |
| Stearine | 2.0 |
| Lecithin | 0.4 |

The product is made using the same procedures used in Example I. The product after extrusion has an overrun of 90% and firmness and dryness texture scores of about 3.1.

Since many modifications, variations, and changes in detail may be made to the above described embodiments, it is intended that all matter in the foregoing description be interpreted as illustrative and not in a limiting sense.

What is claimed is:

1. An aerated or aeratable oil-based cheese composition which is capable of withstanding hot extrusion and baking temperatures, comprising:
   between about 38% and 50% by weight bland stable hydrogenated vegetable oil;
   between about 20% and 40% by weight powdered cheese solids;
   between about 8% and 18% by weight protein containing agent selected from the group consisting of modified whey, non-fat dry milk, and mixtures thereof;
   between about 2% and 4% by weight polyglycerol monostearate containing principally triglycerol monostearate;
   between about 0.3% and 0.7% by weight lecithin;
   from 0 to about 20% by weight whey solids; and
   said composition being substantially moisture free, and being capable of withstanding hot extrusion and baking temperatures of 300° F. without deleterious effects.

2. An aerated or aeratable oil-based cheese flavored composition as claimed in claim 1 wherein the hydrogenated vegetable oil is between about 40% and 50% by weight icing fat.

3. An aerated or aeratable oil-based cheese flavored composition as claimed in claim 1 wherein the hydrogenated vegetable oil is between about 42% and 50% by weight hydrogenated coconut oil; and there is included between about 1.5% and 2% by weight stearine.

4. An aerated or aeratable oil-based cheese flavored composition as claimed in 1, 2 or 3 further comprising about 2% by weight mono and diglycerides.

5. An aerated or aeratable oil-based cheese flavored composition as claimed in claim 1, 2 or 3 wherein the composition is aerated to produce an overrun between about 50% and 100%.

6. An aerated or aeratable oil-based cheese flavored composition as claimed in claim 1 wherein the protein containing agent is between about 8% and 18% by weight of the composition.

7. An aerated or aeratable oil-based cheese flavored composition as claimed in claim 1 wherein the composition has a moisture content of about 2% by weight.

8. An aerated or aerable oil-based cheese composition which is capable of withstanding hot extrusion and baking temperatures, comprising:
   between about 38% and 50% by weight bland stable hydrogenated vegetable oil;
   between about 20% and 40% by weight powdered cheese solids;
   about 8% by weight or more protein containing agent selected from the group consisting of modified whey, nonfat dry milk, and mixtures thereof;
   about 2% by weight mono and diglycerides
   between about 2% and 4% by weight polyglycerol monostearate containing principally triglycerol monostearate;
   between about 0.3% and 0.7% by weight lecithin;
   from 0 to about 20% by weight whey solids; and
   said composition being substantially moisture free, and being capable of withstanding hot extrusion and baking temperatures of 300° F. without deleterious effects.

9. The cheese composition of claim 8, comprising about 38% by weight bland stable hydrogenated vegetable oil, about 20% by weight powdered cheese solids, about 2% by weight mono and diglycerides, about 2% by weight polyglycerol monostearate containing principally triglycerol monostearate and about 0.3% by weight lecithin.

* * * * *

UNITED STATES PATENT AND TRADEMARK OFFICE
CERTIFICATE OF CORRECTION

PATENT NO. : 4,482,575

DATED : November 13, 1984

INVENTOR(S) : Dale F. Olds

It is certified that error appears in the above-identified patent and that said Letters Patent is hereby corrected as shown below:

Col. 6, line 22, claim 4, before "1, 2 or 3" insert -- claim --.

Col. 6, line 45, claim 8, after the line reading "about 2% by weight mono and diglycerides" insert a semicolon (-- ; --).

Signed and Sealed this

Twenty-first Day of May 1985

[SEAL]

Attest:

DONALD J. QUIGG

Attesting Officer     Acting Commissioner of Patents and Trademarks